United States Patent
Eisenberg et al.

(10) Patent No.: US 8,035,679 B2
(45) Date of Patent: Oct. 11, 2011

(54) METHOD FOR CREATING A VIDEOCONFERENCING DISPLAYED IMAGE

(75) Inventors: Aviv Eisenberg, Beer-Seva (IL); Roni Even, Tel-Aviv (IL)

(73) Assignee: Polycom, Inc., Pleasanton, CA (US)

( * ) Notice: Subject to any disclaimer, the term of this patent is extended or adjusted under 35 U.S.C. 154(b) by 1337 days.

(21) Appl. No.: 11/609,735

(22) Filed: Dec. 12, 2006

(65) Prior Publication Data

US 2008/0136898 A1 Jun. 12, 2008

(51) Int. Cl.
*H04N 7/15* (2006.01)
(52) U.S. Cl. .................................... 348/14.09
(58) Field of Classification Search ............... 348/14.09, 348/14.08; 370/260
See application file for complete search history.

(56) References Cited

U.S. PATENT DOCUMENTS

2005/0264648 A1* 12/2005 Ivashin et al. ............. 348/14.09
2008/0091778 A1* 4/2008 Ivashin et al. ................. 709/204

* cited by examiner

*Primary Examiner* — Stella Woo
(74) *Attorney, Agent, or Firm* — Wong, Cabello, Lutsch, Rutherford & Brucculeri, L.L.P.

(57) ABSTRACT

The present disclosure provides methods and systems of multipoint videoconferencing wherein layout description information is used to create videoconferencing displayed images of a composite video of one or more video images and one or more accessory elements. The layout description information is responsive to events in the videoconferencing session. Synchronization between the images of the composite video and the one or more accessory elements is done by using synchronization information that reflects the event.

21 Claims, 9 Drawing Sheets

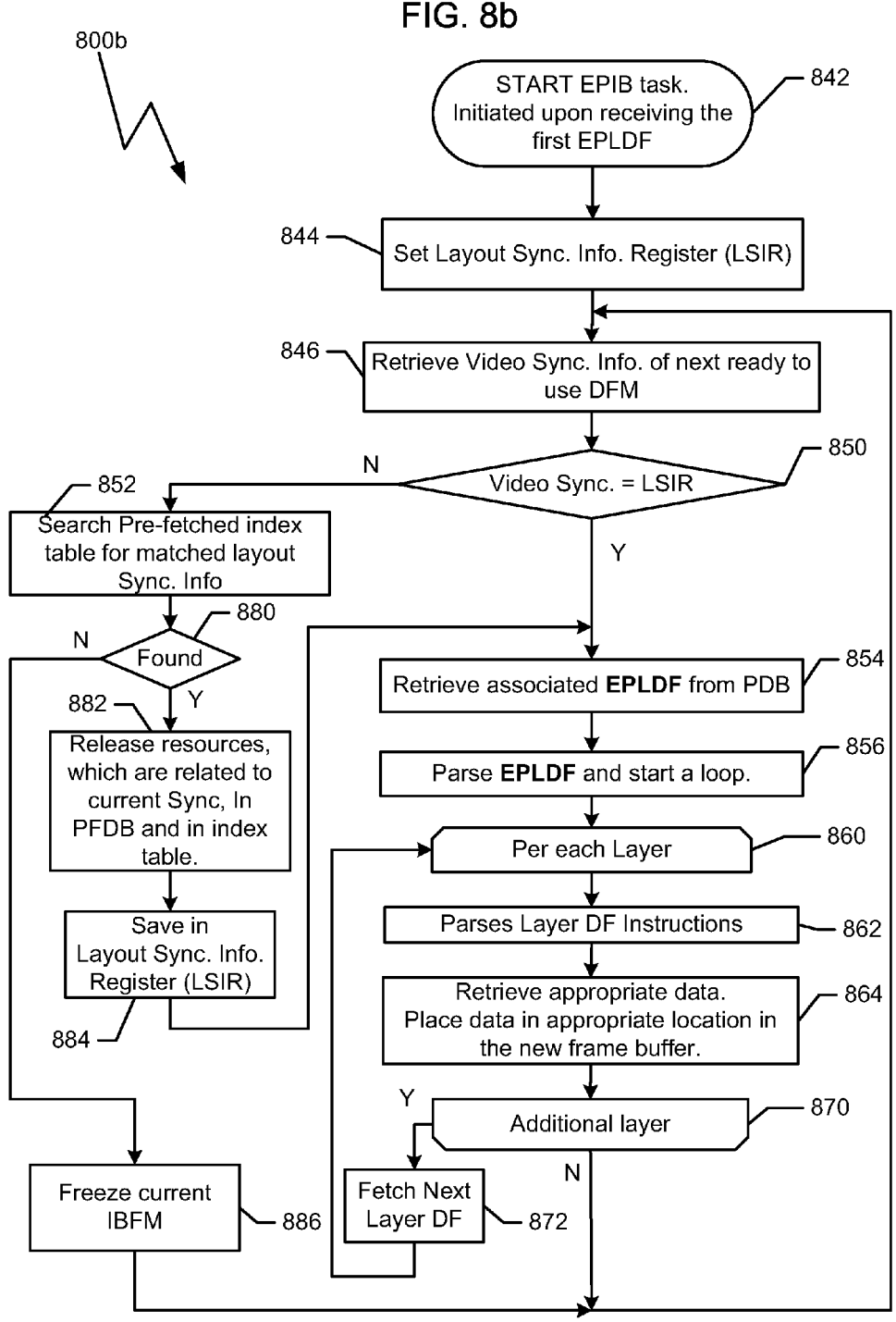

METHOD FOR CREATING A VIDEOCONFERENCING DISPLAYED IMAGE

FIELD OF THE INVENTION

The subject matter of the present disclosure relates to the field of videoconferencing, and more specifically to providing a multipoint videoconferencing displayed image.

BACKGROUND

The display at a videoconferencing endpoint (EP) typically displays video images of one or more conferees and can also display one or more accessory elements. Accessory elements include text information elements, graphics elements, frames around conferees' images, line-art, presentations (content), etc. Some accessory elements can be created at a multipoint control unit (MCU) that controls the videoconferencing session. Such elements typically include an icon of a speaker, a display of a menu for controlling the conference, name of a displayed conferee, a frame around each one of the displayed conferees, etc. Some of the accessory elements can be created by the endpoint itself. These elements typically include an icon indicating a mute microphone, a display of a remote control unit associated with the endpoint, a small video image that is received from a local camera, etc. Other exemplary accessory elements that may be displayed on a screen of an endpoint can include information coming from other sources such as video streams coming from one or more IP servers, web-pages, presentations (content), etc.

Accessory elements that are created by an MCU are typically incorporated into the video stream that is sent from the MCU to an endpoint. This method has several shortcomings. The resolution of the accessory element is limited to the video resolution that is used during the current session, which is typically less than the resolution that a screen of an endpoint is capable of achieving. The quality of the displayed accessory element is therefore less than the quality that could be reached if the accessory element were displayed in the resolution of the screen. Creating the accessory element at the MCU furthermore requires video resources and bandwidth resources from the MCU per each current conferee in each current conference. In addition, accessory elements created and added by an endpoint are unknown to the MCU and therefore may compete on the same screen areas with information or video images that are sent by the MCU, resulting in a jumbled or blurred image from two resources that are not coordinated.

SUMMARY

The present disclosure provides a method of multipoint videoconferencing, wherein an endpoint is provided with instructions for creating a videoconferencing displayed image and one or more streams of video data to include in the layout. The endpoint processes the instructions and composes a videoconferencing displayed image according to the instructions. The disclosed method is particularly suited for including accessory elements in a videoconferencing displayed image because the accessory elements are created by the endpoint according to the instructions rather than created at an MCU and sent to the endpoint as part of a video stream.

According to one embodiment, the instructions are provided to an endpoint as a processable file. Mark-up language files are particularly suitable. Some disclosed embodiments include providing an MCU with MCU layout description files that configure the MCU to compose a composite video according to a conference layout corresponding to various events in a conference. An endpoint is provided with the composite video from the MCU and is also provided with endpoint layout description files instructing the endpoint to compose a videoconferencing displayed image including the conference composite video images. Processing of the MCU layout description files and the endpoint layout description files are synchronized to provide a videoconferencing displayed image at the endpoint.

The description of a layout can include multiple files, each describing a layer of the layout. For example, a first file describing the bottom layer of a layout can be processed, and then a file describing a next layer, and a next layer and so on, as the layout is built up layer-by-layer. Objects appearing on a higher layer will be visible in the layout, in lieu of an object on a lower layer occupying the same pixel address (i.e., X-Y coordinates). Alternatively, a layout can be described by a single file, wherein objects in the layout are assigned a 'Z' value corresponding to the level of the object, for example, with a 'Z' value of zero corresponding with a first layer (numbering from the bottom up), a 'Z' value of one corresponding to the next layer, etc. When two objects share the same pixel addresses of the screen data of a later object (i.e., higher) object is written instead of the data of a lower object.

The present disclosure also provides an apparatus and systems for multipoint videoconferencing wherein an endpoint is provided with instructions for creating and displaying a videoconferencing displayed image. The disclosure provides a layout description file generator adapted to generate endpoint layout description files and/or MCU layout description files. The disclosure also provides MCUs adapted to process MCU layout description files and/or synchronize the processing of MCU layout description files and endpoint layout description files. These and other aspects of the disclosure will be apparent in view of the attached FIGS. and detailed description.

BRIEF DESCRIPTION OF THE DRAWINGS

Exemplary embodiments of the present invention will be more readily understood from reading the following description and by reference to the accompanying drawings, in which:

FIG. 8b illustrates a flowchart showing relevant steps of an exemplary EP image builder.

DETAILED DESCRIPTION

Figure 1:
FIG. 1 schematically illustrates a simplified diagram with relevant elements of an exemplary layout description file of a video conference session.
Figure 1:
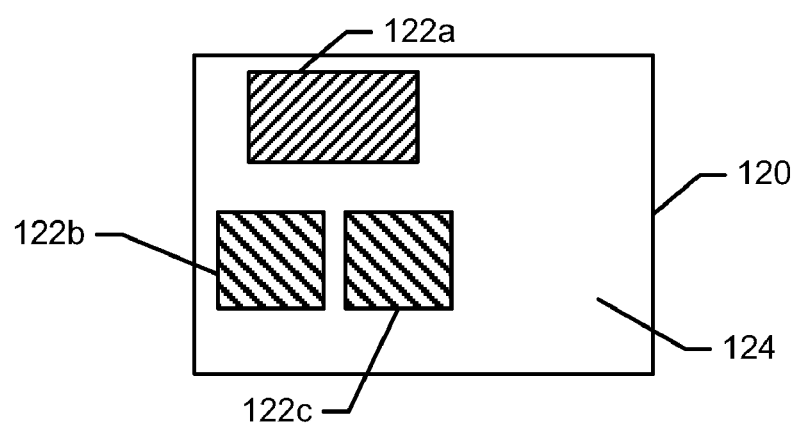
Figure 1:
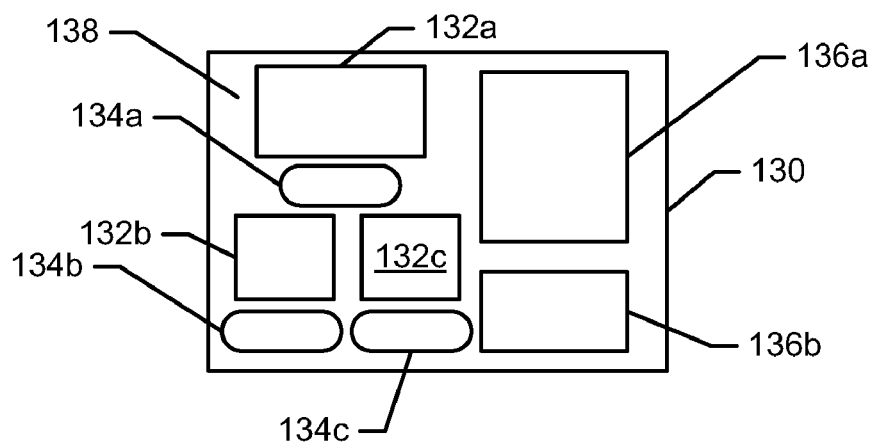

As used herein, the term endpoint refers to a terminal on a network capable of providing real-time, two-way audio/visual/data communication with other terminals or with a multipoint control unit (MCU). An endpoint may provide speech only; speech and video; or speech, data and video communications. Exemplary endpoints include Polycom VSX 7000 (Polycom, Inc.). An MCU is a conference controlling entity located at a node of a network or in a terminal, which receives and processes several media channels from access ports according to certain criteria and distributes them to the connected channels. Examples of MCUs include the MGC-100 (Polycom Inc.). Some MCUs can be composed from two logical units: a media controller (MC) and a media processor (MP). A more thorough definition of an endpoint (terminal) and an MCU can be found in the International Telecommunication Union ("ITU") standards, such as but not limited to the H.320, H.324, and H.323 standards. Additional information regarding the ITU standards can be found at the ITU website www.itu.int.

The disclosure overcomes the deficiencies mentioned in the Background by providing a method of composing a videoconferencing displayed image wherein, rather than the MCU sending the entire composed videoconferencing displayed image via the video stream, information is provided to an endpoint via a communications link that allows the endpoint to compose some aspects of the videoconferencing displayed image. The disclosed methods are particularly suited for handling accessory elements displayed during a videoconferencing session. The accessory elements can be displayed in the appropriate time and location on the screen according to events in a conference session. A change in the location and/or the content or the shape of an accessory element can be triggered by an event in the session. The event can be a new speaker, an additional conferee, a removed conferee, etc.

The disclosure provides a protocol for communication between an endpoint and an MCU. The protocol can be used for communicating information depicting an image to be displayed on the endpoint screen during a videoconference session, with instructions related to the accessory elements (elements) to be display in the image with the video images of the conferees. These instructions may be embedded in a layout description file. A layout description file can include text (such as names of participants, sites, etc.); description and color of each shape (such as rectangle frame, elliptical frame, image, etc.) and the coordinates and size of the shape; software code; JavaScript; synchronization information between events in the conference and the layout description file; etc. This protocol can be used at the beginning of the session during the set up stage. During the ongoing session, the protocol can be used each time a layout is changed or each time one or more accessory elements are changed, etc. An exemplary description file can be created and parsed using a common markup language such HTML, XML, SMIL, etc.

The layout description file can contain two or more layers, each layer described by a layer description file. Each layer description file can be linked to one or more other layer description files that describe associated layers. A layer can include one or more objects representing an accessory element, one or more place holders for a video image of one or more conferees, etc. Areas that are not associated with an object can be defined as transparent area. The transparent area enables underlying objects that were placed during with one or more previous layers to be displayed.

An exemplary description file may include a link to one or more web sites. Those links may request additional information such as presentations, streaming information from video recorders, streaming text such as news, etc., to be displayed during the video conference.

The description file of the first layer (from bottom up) can include information on the number of layers; define a background slide and the link to the next layer. The background slide can cover the entire screen. The next layer can define the location of the composite video that was created by an MCU that conducts the communication session and a link to a next layer, if one exist, or indicate an end of layout description file (EOLDF).

The final (top) layer can include visible areas or objects that are placed on top of and cover the previous layers. Areas that are not associated to an object can be defined as transparent areas. The transparent area enables objects underneath to be viewed. The top layer description file may include an indication of the end of the layer description file (EOLDF). Exemplary visible areas may include frames surrounding each conferee's video image, frames with the name of the site or conferee associated with each video image, menus, icons, etc. Each layer can define areas and associated URLs from where information can be retrieved and displayed in the associated areas. The URL can include information such as presentation, a video stream, etc. Such a link to a URL can be displayed to the conferee to be selected and displayed. Alternatively, the endpoint can activate the link automatically.

A layer description file can define areas in the layout to be controlled by the endpoint. In those areas the endpoint can display information that is related to the endpoint. For example an indication that the microphone of the endpoint has been muted by the conferee can be displayed.

In an alternate embodiment of a layout description file, each object can have a 'Z' parameter that is associated with the object's location and size. The 'Z' value can reflect the level of the object, for example, with a 'Z' value of zero corresponding with a first layer (numbering from the bottom up), a 'Z' value of one corresponding to the next layer, etc. An exemplary image builder of an endpoint may first place, in the appropriate addresses of a frame memory module, all the objects with Z=0, then all the objects with Z=1, etc. When two objects share the same pixel addresses of the screen data of a later object (i.e., higher) object is written instead of the data of a lower object.

A frame memory module is a memory that stores video data associated with one or more video frames. A common frame memory module may employ two or more frame memories (current displayed frame memory, next frame memory, for example). The memories alternately store and alternately output video data of consecutive frames. Each address of a frame memory is associated with a pixel or a group of pixels on the screen.

An exemplary composite video sent from an MCU can be a single video stream constructed from one or more video images of selected conferees. Alternatively, the MCU can deliver a plurality of video streams rather than a single composed video data stream. Each video stream can include a video stream of a selected conferee. A video stream can be scaled to an appropriate size according to the size of its associated area in the videoconferencing displayed image. Each video stream can be sent over a video channel on a single multimedia connection line, for example, using a mechanism that can be similar to that of H.239 for video session using H.323. For video session using SIP the mechanism can use Labels and Groups. H.239 and H.323 are communication standards of ITU.

An exemplary MCU can be adapted to create the description file and to communicate the file to the endpoint. Alternatively, the MCU can be adapted to generate information needed to create such a description file and to transfer this information to an associated server. The associated server can create one or more layout description files and can communicate them to one or more endpoints. The associated server can also create one or more MCU layout description files communicate them to one or more video output modules of an MCU. The associated server can be embedded in an MCU or can communicate with the MCU over a network.

The MCU can handle audio and video signals of one or more videoconference sessions. The received audio signals can be decoded and mixed according to the requirements of each one of the conferences. The mix signal can be encoded and sent toward the appropriate endpoints. The received video streams can be processed by the MCU into one or more conference video streams. The conference video can be a composed video wherein received video streams at the MCU can be decoded; scaled to the appropriate size; and placed in an appropriate location (pixels in the spatial domain) in a frame memory to create a composite video. The composite video can be encoded and sent to the appropriate endpoint. The location and the size of images from each endpoint in the composite video can be constructed according to the definitions in the description file.

Alternatively, the MCU can decode each video stream; scale them to the appropriate size; encode the scaled images; and send them to the appropriate endpoint. The endpoint can receive the plurality of scaled video images, decode them, and place them in a picture memory according to the description file to create a videoconferencing displayed image.

Rather than constructing a composite video stream itself, the MCU can select one or more conferees to be displayed in a videoconferencing displayed image based on some criteria of the session and rout the compressed audio/video (A/V) streams coming from the selected endpoints to the receiving endpoint. The receiving endpoint is responsible for receiving the selected compressed A/V streams coming from the MCU; decoding the streams; mixing the audio streams; scaling and placing the decoded video stream of each conferee in the appropriate location (pixels) according to a layout description file that is relevant to the session.

Still alternatively, rather than the MCU selecting one or more conferees to be displayed the selection can be done by the receiving endpoint. The MCU can rout the compressed A/V streams from all of the conferees to one or more receiving endpoints. Each receiving endpoint can be capable of autonomously selecting one or more A/V streams to be mixed and displayed on the screen of the receiving endpoint.

The MCU can manage transferring a description file to an endpoint at an appropriate time. Furthermore, synchronization information can be used to synchronize the delivered audio/video signals to each of the endpoints with a description file that is simultaneously used by the endpoint. Synchronization information can include an ID number of a layout description file that is relevant to a current A/V stream. Synchronization information can be created and sent by the MCU to the endpoint each time a change in the sources of the audio and/or video stream being mixed and/or composed by the MCU occurs.

The synchronization information can be sent out of band, for example, over a signaling connection or can be sent in-band. For example, if the H.264 compression standard is being used, a Supplementary Enhanced Information (SEI) packet can be used to transmit synchronization information. The SEI packet attached to each frame can be used to carry signaling and control information. If H.263 is the compression standard, one or more Picture Supplemental Enhancement Information (PSUPP) fields in the frame header can be modified to carry the synchronization information. Alternatively, the synchronization information can be embedded within a RTP header of a video packet.

A layout description file generator (LDFG) can be used to generate one or more endpoint layout description files (EPLDF) and one or more MCU layout description files (MCULDF) per each event in the video conference session. The LDFG can add synchronization information to each of the MCULDFs and the EPLDFs that are related to the certain events in the conference. The layout description file generator can deliver preliminary layout synchronization information to a new conference (an ID number of a layout, for example) and the value of the layout synchronization information can be incremented each time a change in the layout is required. The layout synchronization information can be delivered to the MCU and the relevant endpoints as one of the fields of each layout description file. In such an embodiment the MCU may send an indication to the layout description file generator indicating a change in the session. On receiving this indication, the layout description file generator can increment the layout synchronization information, change two or more layout description files, associate each of the changed layouts with the incremented (updated) layout synchronization, and send the updated layout description files with the associated layout synchronization toward the relevant endpoints and the relevant output modules of the MCU. The MCU can be adapted to associate the composite video created based on the updated layout description file with the updated layout synchronization information. The synchronization information associated to the composite video is referred to as video synchronization information.

In the present disclosure, the terms "MCU synchronization information," "video synchronization information," and "synchronization information" can be used interchangeably. Likewise, the terms "EP synchronization information," "layout synchronization information," and "synchronization information" can be used interchangeably. Moreover, the term synchronization information may represent both "video synchronization information" and "layout synchronization information."

An LDFG can create a plurality of EPLDFs and MCULDFs that can describe layouts that cover all possible options of events in a particular conference. A common video conference session can have a limited number of layouts based on a limited number of conference event/configurations. Each EPLDF and MCULDF can be associated with synchronization information. The MCU can be adapted to select the appropriate MCULDF based on the event and to add the MCU synchronization information to a conference video that is sent to the endpoint. The endpoint can be adapted to select the appropriate EPLDF based on the MCULDF.

To support the disclosed layout description mechanism, an endpoint can include an endpoint parser and image builder (EPP&IB) for analyzing a received description file. An EPP&IB can include a pre-fetcher parser that parses new EPLDFs and pre-fetches and stores new EPLDF with its associated accessory elements (objects) in a database (or a cache). The exemplary EPP&IB can include an EP image builder that parses a pre-fetched EPLDF matching the video synchronization of a ready-to-use next endpoint's decoder frame memory; parses the matched pre-fetched EPLDF and creates the composite video image with the accessory elements to be displayed on the screen of the endpoint.

An endpoint can be adapted to receive an indication to retrieve a layout description file. The indication can be sent from the MCU. On receiving the indication the endpoint can fetch the description file and determine whether it is newer than the layout description file currently being used. If it is a newer layout description file, then the endpoint can adjust the relevant modules to perform according to the new file on receiving the appropriate video signals from the MCU. Alternatively, an endpoint can be adapted to fetch the layout description file periodically, for example, once every period 'D,' which can be a few seconds to a few minutes. The period 'D' can match a minimum time interval used by the MCU to determine whether to replace (update) a speaker.

The disclosure can be further understood with reference to the drawings. In the drawings like numerals represent like elements throughout the several views. For convenience, only some elements of the same group may be labeled. The drawings illustrate examples of the disclosed embodiments and are not intended to limit the disclosure in any way. Therefore, features shown in the drawings are chosen for convenience and clarity of presentation only; dimensions of components and features are chosen for convenience and clarity of presentation and are not necessarily shown to scale.

FIG. 1 illustrates a simplified diagram of three layers 110, 120 and 130. Layers 110, 120 and 130 are described by an exemplary layout description file (LDF) 100 of a video conference. The layout description file depicts how the layout of the conference can be constructed from three layer description files linked to each other. The first layer description file can include synchronization information such as time stamp, layout identification number ID, etc.; control information relevant to the layout, such as the number of layer description files, etc.; and a URL from where a background slide with the image 112 can be retrieved with the size and the coordinates of the top left corner of background slide. The first layer description file can be terminated with a URL of the next layer description file and a flag indicating the end of the present layer description file. In the example of layer 110 a background slide is defined 112. Its top left corner can be pixel 0:0 (the top left pixel of the screen) and the size can be the entire frame (e.g., 352 by 288 pixels for CIF resolution, or 720 by 1280 pixels for High Definition (HD) resolution). Other background slides can be used, such as images, other sizes, etc. Other first layer description files can include information on the slide and the slide itself rather than a link to the information.

The second layer description file can include links to objects such as video image rectangles 122a-c. Each object can include information such as location (top left corner of each rectangle) and size of each rectangle 122a-c in which a conferee's video image will be displayed. Alternatively, an object can include a software code such as JavaScript. The code can instruct an endpoint image builder to copy data relevant to areas 122a-c from its corresponding location in the decoder's frame memory to the corresponding location in the builder's frame memory, while leaving the locations in the builder's frame memory that are outside of the rectangles 122a-c, i.e., area 124, as is with the information that was previously written during processing the previous layer. The second layer description file can be terminated with a URL of the next layer description file and an indication indicating the end of the present layer description file.

The third layer description file can define the top layer of the layout description file 100. The third layer description file can define location, size, and shape of accessory elements 132a-c, 134a-c, 136a & b, and transparent area 138. In FIG. 1 accessory elements 132a-c define borders that are placed over the video images areas 122a-c respectively. Elements 132a-c define rectangular shapes plotted with a line of a certain width and color. Each element 132a-c can match the location and the size of its respective video image area 122a-c.

Elements 134a-c define rounded rectangular shape filled with a particular color area and including text that is relevant to its associate video image 122a-c respectively. The relevant text can be the name of the conferee who's image is displayed in the corresponding area 122a-c, the name of the site, the type of the endpoint, or any combination these types of data, for example. Each of elements 136a and 136b can define location and size areas for displaying external data with a URL from where the data for each area is fetched.

The third layer description file may also include software code, such as JavaScript instructing the image builder of the endpoint how to place data of the relevant elements over the data written into the frame memory from the previous layers. JavaScript may instruct the image builder of the endpoint to create and place pixel information related to the accessory elements 132a-c and 134a-c in the appropriate location in the builder's frame memory, replacing previous information. In other words, the pixel information related to the accessory elements can replace a portion of the data describing background slide 112 and/or a portion of the data describing a portion of the video image data 122a-c.

Referring still to layer 130, the JavaScript can fetch external data from a URL that is associated with areas 136a & b and place the data in the builder's frame memory above the previous data that belonged to a lower layer such as background slide 112. The remainder of the builder's frame memory, which is related to pixels covered by transparent area 138 is not changed and continues to display information that was created during processing the previous layers. The third layer description file can be terminated with an indication indicating the end of the layout description file.

Any number of layers, accessory elements, video images, external sources, etc., can be used. Alternatively, the disclosed method can be implemented using one layer wherein the objects are assigned a 'Z' value associated with the object's coordinates and size and reflect the level (i.e., bottom to top "layer") of the object. According to this embodiment, layout 100 corresponds to a single layer description file that includes all elements 110 to 136, each element having a level ('Z') value. Element 112 will have a level value of zero (Z=0), for example. Elements 122a-c can have a level value of one (Z=1) and elements 132a-c, 134a-c and 136a & c can have a level value of two (Z=2).

A builder can first fetch objects that have level value of zero and place those objects in the relevant location in the builder's frame memory. To generate the layout of FIG. 1 the builder first fetches the background slide 112 having a 'Z' value of zero and be places background slide 112 in the frame memory. Then objects with the level value one (object 122a-c) are fetched and processed. The builder can use the coordinates and size of elements 122a-c for fetching video data from pixels in the frame memory of the decoder of the endpoint that are equivalent to the pixels of 122a-c. The fetched video data is written over the data of the background slide 112. After placing the last video data that is associated with element 122c, objects with level value of 2 (object 132a-c, 134a-c, and 136a-c) are searched and processed. Per each object, a shape with or without text is generated according to the instructions associated with the object and the data is written in the appropriate location (pixels) of the frame memory of the Image builder. Then external data (video streams, presentation, content, etc.) is fetched according to its URL and be displayed in the area 136a and 136b.

Figure 2:
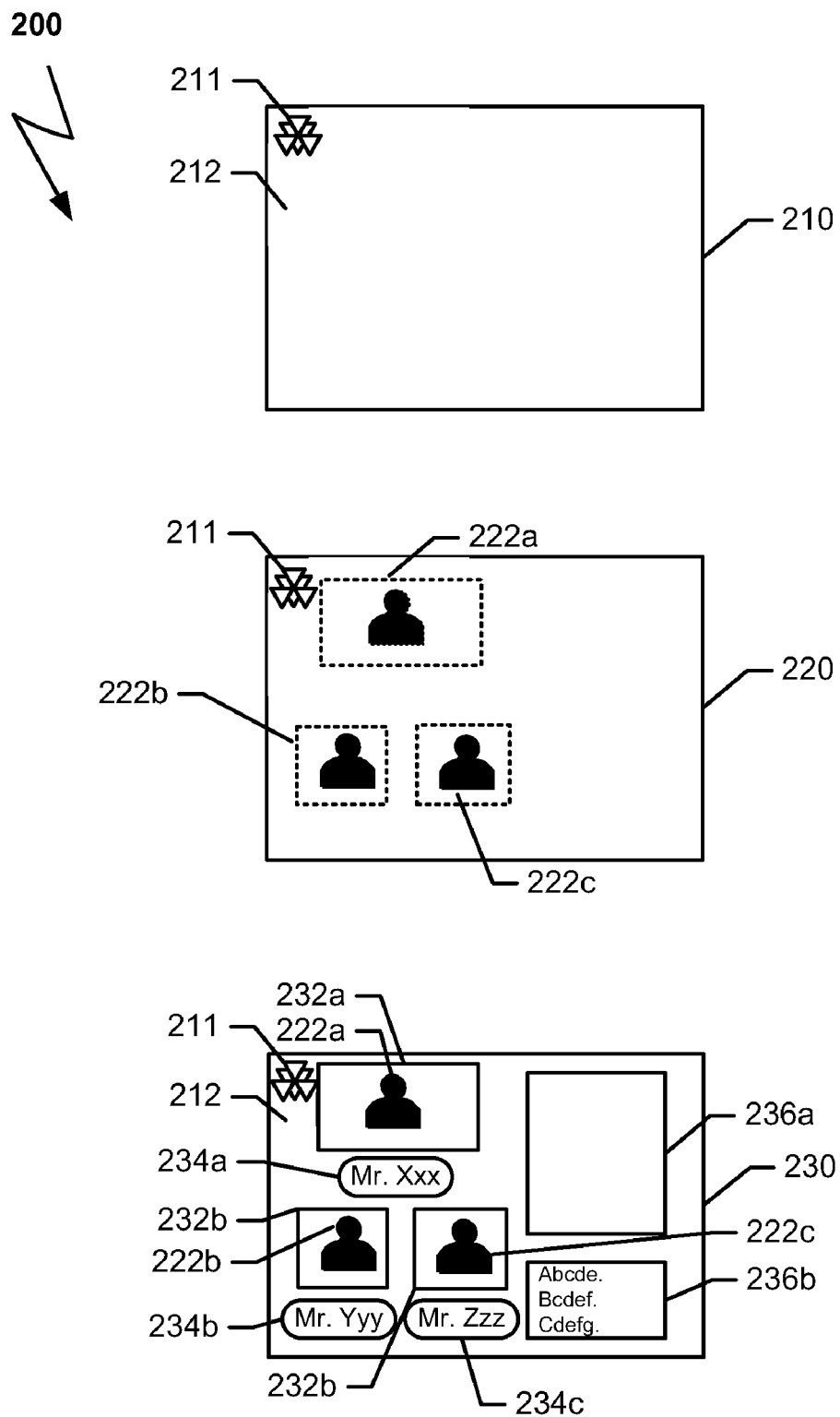
FIG. 2 schematically illustrates a simplified diagram of snapshots of a frame memory of a an image builder during preparing the EP next frame memory.

FIG. 2 illustrates a simplified diagram of a frame memory 200 of an exemplary image builder during preparing a next frame memory. By way of example, three phases of preparing the next frame memory are used: 210, 220, and 230. Phase 210 illustrates the next frame memory after storing the data of a background slide 212. The background slide 212 can include a logo of a company 211 and a background flat color, for example. Phase 220 illustrates the next frame memory after storing conferee's video image data 222a-c. The conferee's video image data 222a-c is fetched from the decoder frame memory from addresses associated with pixels or groups of pixels equivalent to the pixels/group of pixels of area 122a-c respectively (FIG. 1). The conferees' video image data 222a-c replaces or is placed on top of the data of the background slide 212.

Phase 230 illustrates the next frame memory at the end of placing the data of the accessory elements 232a-c, 234a-c and 236a & b. The pixels values of borders 232a-c are created and placed in the next frame memory in pixels or group of pixels defined by objects 132a-c respectively (FIG. 1). The pixel values of 232a-c replace or are placed on top of, or are mixed with the data of the background slide 212 of phase 1 and/or the data of the conferees' video image 222a-c of phase 2. The pixel values for the names areas 234a-c are created and placed in the next frame memory in pixels or groups of pixels defined by objects 134a-c respectively (FIG. 1). The values of objects 234a-c replace or are placed on top of the data of the background slide 212. Data from external sources is fetched and placed in the next frame memory in pixels or groups of pixels that are defined by objects 136a & b respectively (FIG. 1). The next frame memory is then ready to be displayed and the image builder may start preparing the consecutive next frame memory.

Figure 3:
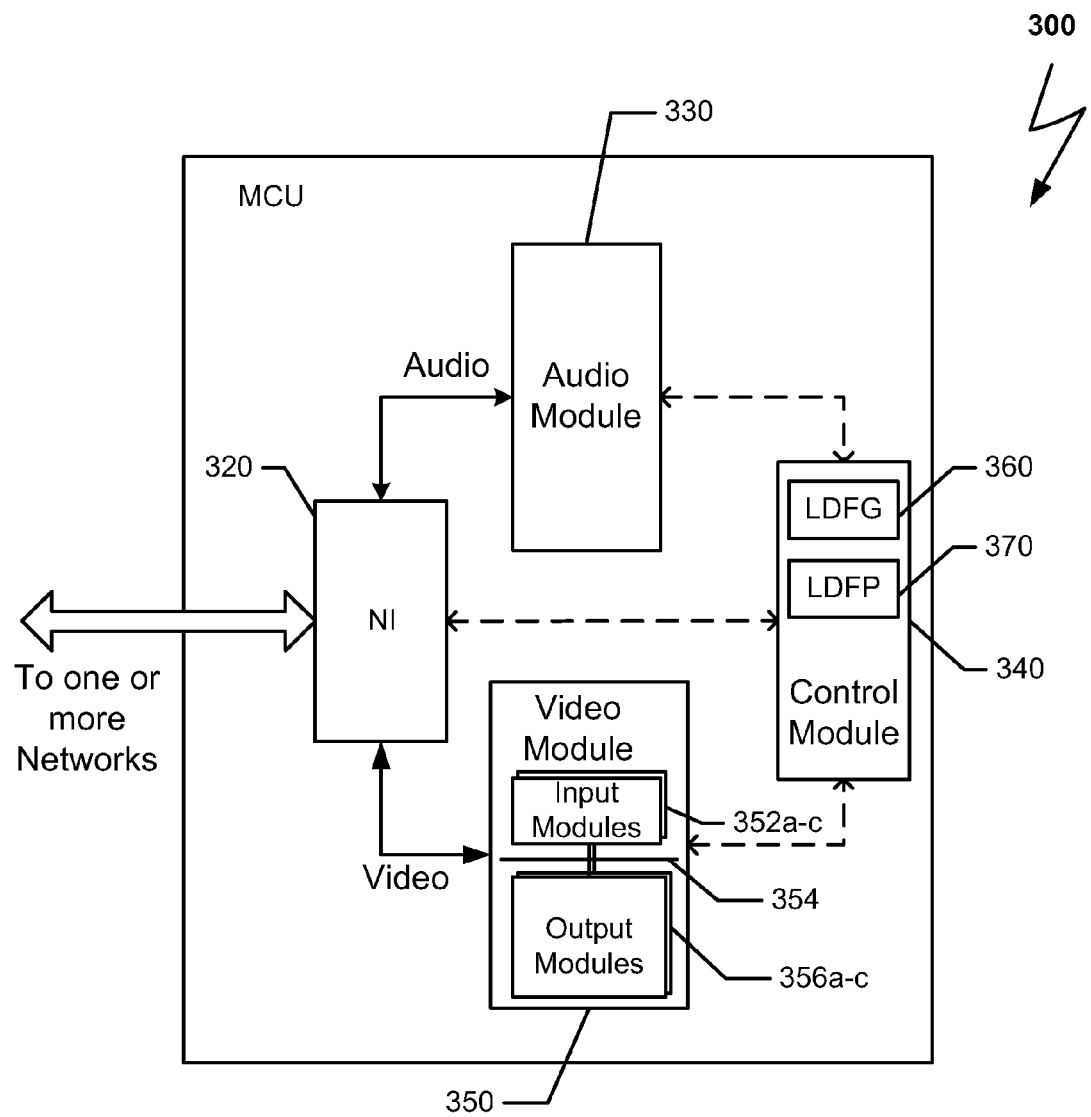
FIG. 3 is a simple block diagram with relevant elements of an MCU.

FIG. 3 illustrates an MCU 300 implementing aspects of the disclosed methods. MCU 300 includes a network interface (NI) 320, an audio module 330, a control module 340, and a video module 350. Alternatively, a decomposed MCU can be used, wherein the audio module 330, the video module 350, and a part of the NI 320 can be embedded within a media processor (MP). The control module 340 and another part of the NI 320 can be embedded within a media controller (MC). The MC can control one or more MPs.

The network interface 320 receives communications from a plurality of endpoints via relevant networks and processes the communications according to one or more of a variety of communication standards. Network interface 320 can receive and transmit control and data information to/from other MCUs and/or one or more layout description file generator servers (not shown). More information concerning communication between endpoints and/or MCUs over different networks and information describing signaling, control, compression, and how to set a video call, etc., can be found in the International Telecommunication Union ("ITU") standards H.320, H.321, H.323, SIP, H.261, H.263 and H.264.

Video module 350 receives compressed video from the plurality of endpoints associated with the MCU 300 via NI 320. The video module 350 can create one or more continuous presence (CP) video data layouts according to one or more layout description file (LDF) associated with one or more conferences currently being conducted by the MCU 300. The received compressed video input streams are processed, composed, and encoded by the video module 350. An exemplary video module 350 can have a plurality of input modules 352a-c, output modules 356a-c, and a common interface 354.

Each input module 352a-c as well as each output module 356a-c can be associated with one or more endpoints.

Common functionality of the various components of video module 350 are known in the art and are not described in exhaustive detail herein. Video modules are described in U.S. patent application Ser. No. 10/144,561; U.S. Pat. No. 6,300,973; and International Application Serial No. PCT/IL01/00757, the contents of which are incorporated herein by reference.

Audio module 330 receives, via the audio line, compressed audio streams from the plurality of endpoints via NI 320. The audio module 330 processes and mixes the compressed audio streams and sends a compressed mixed signal via the audio line back to NI 320, which sends the audio to the endpoints. Audio streams sent to different endpoints can be different. For example, they can be formatted according to different communications standards according to the needs of the individual endpoints. Also, the audio stream may not include the voice of a user associated with the endpoint to which the audio stream is sent, but that voice may be included in all other audio streams.

Audio module 330 can be adapted to analyze the received audio signals from the endpoints and determine the audio signal energy of each endpoint. Information on the signal energy can be transferred to the control module 340. The energy level can be used as a selection parameter for selecting appropriate one or more endpoints as the source for the mixing of the audio and/or the video of the conference, referred as "presented endpoints."

The control module 340 can be a logic unit that controls the operation of the MCU 300. In addition to common operations of a typical MCU, MCU 300 is capable of additional operations as result of having control module 340. Specifically, the control module 340 includes a logic module for generating a layout description file (LDF), a LDF generator (LDFG) 360, and a logical module for parsing a received LDF, a LDF parser (LDFP) 370. Furthermore, control module 340 can be capable of receiving an indication about events that occurs during the conference. Exemplary events can be a new speaker, a conferee that being disconnected, a new conferee joining the conference, etc. A message with information regarding the event can be created and is sent to LDFG 400a (FIG. 4). The information can include the session ID, endpoint ID, information on the endpoint, etc.

LDFG 360 can retrieve information relevant for creating a LDF such as one or more conference profiles that can be used during the session. A profile of a conference can define a background slide; the types of layouts that can be used during a session; one or more policies for selecting presented conferees; type, shape and location of accessory elements; etc. The information can be retrieved from a management entity. The management entity can be used to reserve a conference session, initiate an impromptu conference, define a conference profile, monitor and controlling a videoconference, etc. More information about management entities, conference profiles, and layouts are disclosed in U.S. Patent Publication Nos. 2005/0091380; and 2005/0058088 and in U.S. Pat. Nos. 6,760,750; 7,085,243, the contents of which are incorporated herein by reference.

Based on the retrieved information LFDG 360 can create one or more LDFs per each endpoint participating in the session and one or more LDFs for the MCU that conducts the session. Synchronization information can be created and associated to each LDF by the LDFG 360. The synchronization information can be updated each time a change occurs in the sources of the audio and/or video stream mixed/composed by the MCU. The synchronization information can be sent as a field in the layout description file or as an associated packet. Each LDF can be sent toward the relevant endpoint or MCU. Alternatively, the appropriate one or more LDFs can be retrieved by the appropriate endpoint and/or MCU. Still alternatively, LDFG 360 can be an external server that can communicate with the MCU 300 and the plurality of endpoints. Still alternatively, LDFG 360 can be embedded with a management entity. More information on the operation of LDFG 360 is described below in conjunction with FIGS. 4a and 6.

LDFP 370 can receive from the LDFG 360 one or more MCU LDFs relevant to a current session and parse the received LDFs. Based on the parsed LDFs the LDFP 370 determines how many CP layouts are needed and what type of composed video to generate per each endpoint involved in the session.

LDFP 370 can be capable of associating video synchronization information to delivered media (mixed audio and composed video) to each of the endpoints. The video synchronization information can be used at the endpoint to match the received composite video with the endpoint LDF used while presenting the delivered media. Video synchronization information can include an ID number of a layout description file relevant to the current combination of the A/V streams.

The video synchronization information can be sent out of band, for example, over a signaling connection. Alternatively, the synchronization information can be sent in-band. For example, using the compression standard H.264, a Supplementary Enhanced Information (SEI) packet can be used. The SEI packet is attached to each frame and can be used to carry signaling and control information. If using H.263 as the compression standard, one or more Picture Supplemental Enhancement Information (PSUPP) fields in the frame header can be modified to carry the synchronization information. If communication between the MCU and the endpoints uses H.323 or SIP protocol, the synchronization information can be embedded within a RTP header of a packet. The NI module 320 can be adapted to add LDF video synchronization information to the RTP header of the packets that carry the video conference data between the MCU and the endpoints. The information is added based on instructions received from the control module 340. More information on the operation of LDFP 370 is depicted below in conjunction with FIGS. 4b and 7.

More information on how an MCU receives, decodes, scales, composes two or more decoded streams, and/or composes decoded streams into one or more composite video of a CP conference is disclosed in U.S. Pat. Nos. 6,300,973; 6,496,216; 6,757,005; 7,054,820; and 7,113,992 and in U.S. Patent Publication Nos. 2004/0042553; and 2003/0174202, the contents of which are incorporate herein by reference.

Figure 4A:
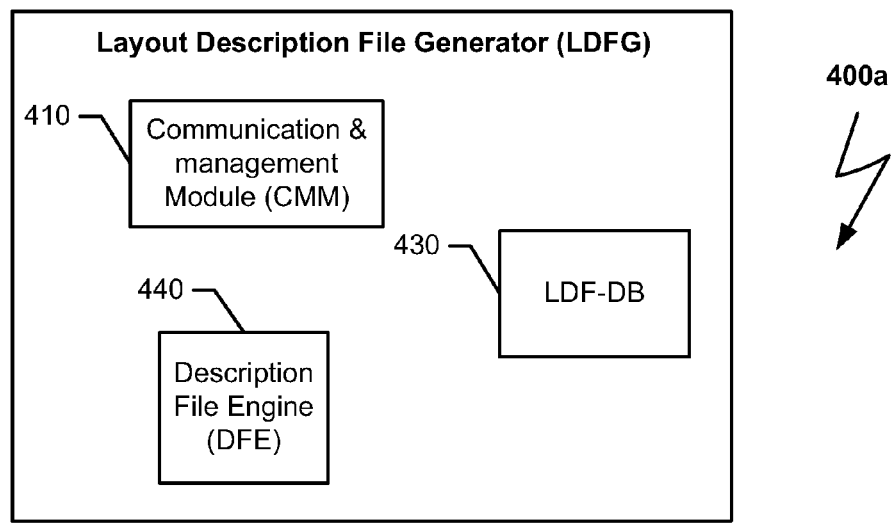
FIG. 4a is a simple block diagram with relevant elements of an exemplary Layout Description File Generator (LDFG)

FIG. 4a is a simple block diagram illustrating a Layout Description File Generator (LDFG) 400a. LDFG 400a can be embedded within an MCU as a section of the control module 340 as illustrated in FIG. 3. Alternatively, LDFG 400a can be a server on a network communicating with a plurality of endpoints and with one or more MCUs via the network. Communication with LDFG 400a can be via Internet Protocol (IP), for example. Still alternatively, LDFG 400a can be embedded within a management entity (e.g., a management server) such as is used for reserving a conference session, initiating an impromptu conference, defining a conference profile, monitoring and controlling videoconferences, etc. LDFG 400a is capable of delivering a plurality of MCULDFs to one or more MCUs involved in a video conference session and an EPLDF to each endpoint involved in a video conference session.

LDFG 400a can include a communication and management module (CMM) 410, a layout description file database (LDF-DB) 430, and a description file engine (DFE) 440. LDFG 400a can get, via CMM 410, requests for generating a LDF and relevant information (parameters) such as a conference profile, for example. The conference profile can define the types of layouts to be used, the location of the windows (areas) of each conferee's video image in a composed CP video associated to the layout and to be generated by the MCU, what type of accessory elements are to be defined by the one or more LDFs, etc. The conference profile can also define the number of layouts that can be used during the session. For example, the number of layouts can be varied between a plurality of layouts, one per each conferee, or one layout that will be distributed to all of the conferees or any combination between the two.

CMM 410 processes the received conference profiles and determines the number of LDFs that are needed for the session. One session may require a first group of LDFs to be delivered to the relevant MCU (MCULDF), for example, one LDF for each composite video to be built and delivered to the relevant endpoints. A second group of LDFs can be created and sent by the LDFG 400a, the second group including a LDF for each of the endpoints involved in the session (EPLDF). After defining the two groups of LDFs, CMM 410 can allocate computing resources for creating the plurality of LDFs and storage resources in LDF-DB 430.

CMM 410 can be capable of synchronizing the plurality of LDFs so as to synchronize the media (mixed audio and composed video) to each of the endpoints with the LDF that will be used by that endpoint to present the delivered media. Synchronization information can include an ID number relevant to the current combination of the layout and the media streams (i.e., audio and video). Each time a change in the session occurs, which requires a change in one or more LDFs, the ID number in the synchronization information can be incremented by one and be delivered to DFE 440.

DFE 440 can create the first LDF for a destination and then can adapt and update the LDF according to changes and events during the conference. DFE 440 can include a modified markup language (ML) engine such as an HTML engine, XML engine, etc. for creating a layer description file. Each created LDF can be stored in LDF-DB 430 and can be accessed via a URL, for example. In addition to storing ready-to-use LDFs, LDF-DB 430 can store a plurality of accessory elements that may be needed for creating a LDF. The LDF-DB 430 may store a plurality of profiles, background slides, template LDFs to be used by one or more organizations using the conferencing system, graphical information and icons used by the different type of endpoints, content, etc. A template LDF can define a set of layer description files with areas for different objects and text. A template LDF can be adapted to a certain conference by the DFE. An exemplary adaptation can be name tags of the current presented conferees. An exemplary template LDF is illustrated FIG. 1.

An MCULDF created and delivered to an output module 356a-c (FIG. 3) of an MCU may include a single layer description file. The DFE 440 can collect information required to create the layer description file such as the location of the top left corner and the size of each of the areas (windows) allocated to a video image of conferees to be presented and where to retrieve the relevant decoded video data belonging to the relevant conferee. The information can be an input module 352a-c (FIG. 3) assigned to the conferee whose image will be displayed in the area. Alternatively, the DFE may associate an area with a conferee ID number in the LDF and allow the MCU to match the input module 352a-c

(FIG. 3) with its associated conferee. After defining all of the areas, an end of LDF indication can be added to the layer description file. The layer description file is stored in the LDF-DB 430 in the URL assigned to this MCULDF. An indication that an updated LDF is ready can be delivered to the associated destination.

DFE 440 can be adapted to create an EPLDF that includes two or more layer description files. Information relevant to the EPLDF is gathered by the DFE 440. The information can include a relevant section from the conference profile related to the relevant endpoint, current conferees that will be displayed on the screen of the relevant endpoint, parameters on the endpoint related to the layout, etc. Endpoint parameters include the type of endpoint, what accessory elements can be added by the endpoint, type of screen (wide screen, for example), resolution, etc.

After collecting the required information an appropriate template LDF can be retrieved from the LDF-DB 430. The retrieved template LDF can be modified by the DFE 440 according to the needs of the current session. Exemplary modification of the template LDF can include adding synchronization information, writing the appropriate URLs (i.e., URLs for the appropriate background slide 110, the next layer description file, relevant content 136a & b FIG. 1, etc.) and adding appropriate text and tags such as names of the conferees associated with areas 134a-c. The modified template LDF can be stored in the LDF-DB 430 with its assigned URL. An indication that an updated EPLDF is ready can then be delivered to the associated destination.

Referring again to FIG. 4a, communication between the LDFG 400a and the endpoints or the MCUs can be via a packet-based network such as a LAN, Internet, Intranet, etc. or any other type of network used for communication between computers. A signaling and control connection can be set between the CMM 410 and each one of the entities involved in the session. Each signaling and control connection can carry control information such an indication of an updated ready-to-use LDF with its URL. Such indication can be sent from CMM 410 toward an endpoint or MCU. Another indication can indicate a new event occurring during the session and requiring an update of one or more LDFs; etc. On receiving such an update indication (an LDF ready message) with a URL, an endpoint or an MCU can retrieved the updated LDF from the LDF-DB 430 using the received URL.

Alternatively, a signaling and control connection can be set between the LDFG 400a and the one or more MCUs. An indication for an updated ready-to-use LDF and its URL can be sent to an endpoint via the signaling and control connection to the MCU and from the MCU to the endpoint.

Still alternatively, the LDFG 400a can be a section of the control module 340 (FIG. 3) of the MCU 300 (FIG. 3), and communication with the endpoint can be via H.323 and/or SIP via NI 310. Communication with one or more management servers can be via an IP network via NI 310 or directly by the CMM 410. An internal LDFG can communicate with other sections of the MCU and with the control module 340 via one or more internal buses of the MCU.

A plurality of DFEs 440 can be used to create a plurality of LDFs in parallel using a plurality of modules. More information on the operation of LDFG 400a is provided below in conjunction with FIG. 6.

Figure 4B:
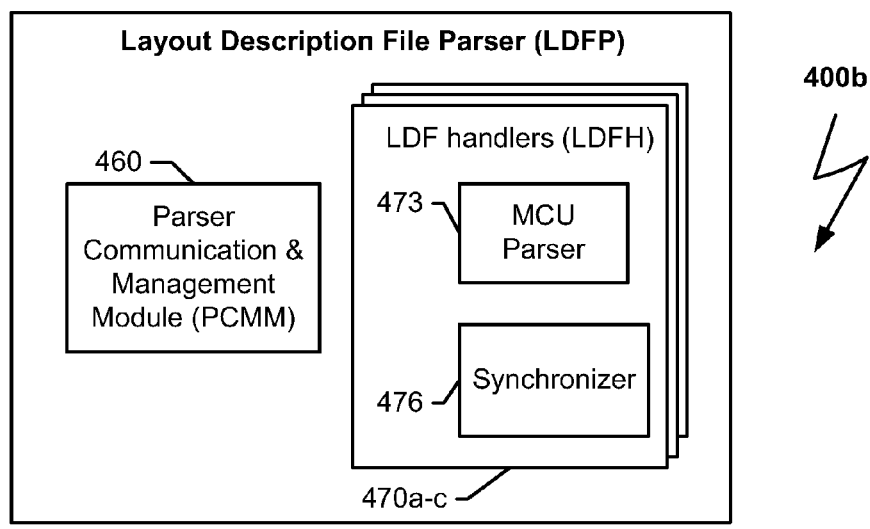
FIG. 4b is a simple block diagram with relevant elements of an exemplary MCU Layout Description File Parser (LDFP)

FIG. 4b illustrates elements of an MCU Layout Description File Parser (LDFP) 400b. An LDFP 400b can be embedded within an MCU as a section of a control module 340, as illustrated in FIG. 3. LDFP 400b includes a parser communication and management module (PCMM) 460 and a plurality of LDF handler modules (LDFH) 470a-c. Each LDFH can be associated with a URL pointing to an MCULDF and can serve an active output module 356a-c (FIG. 3). LDFP 400b can get a plurality of URLs from LDFG 400a via PCMM 460. Each URL can point to an updated ready-to-use LDF associated with an active output module 356. For each new URL, resources are allocated and a new LDFH 470a-c process is initiated for handling the relevant MCULDF. The URL is then transferred to the new LDFH 470 for further processing.

LDFH 470a-c can include an MCU parser 473 and a synchronizer 476. Synchronizer 476 can be used for receiving synchronization information created by LDFG 400a and be sent as part of the MCULDF, parsed by the parser, and delivered to the Synchronizer 476. The synchronization information is processed by the synchronizer and delivered as video synchronization information to the encoder of the output module 356a-c (FIG. 3) associated with the LDFH 470a-c. This information is used to synchronize the composite video to be created and delivered by the associated output module 356a-c (FIG. 3) with the EPLDF used in an associated endpoint. The video synchronization information can be sent to the endpoint as Supplementary Enhanced Information (SEI) packet or as Picture Supplemental Enhancement Information (PSUPP). Alternatively the layout synchronization information can be delivered to the NI 310 (FIG. 3) and be added to the RTP header or can be sent over a dedicated connection such as an IP connection to the endpoint.

Based on the received URL, a request for fetching the updated MCULDF can be sent to LDF-DB 430. The request can be sent via PCMM 460 to the LDFG 400a. The received MCULDF can be transferred via PCMM 460 to Parser 473. Parser 473 can parse the MCULDF and determine the size and the location in the screen per each presented conferee's video image and the relevant ID of the conferees. The information related to the location, size, and conferee's ID with the layout synchronization information is transferred to the relevant output module 356a-c (FIG. 3) via PCMM 460. Based on this information the relevant output module can be set to retrieve decoded video data from the appropriate input modules 352a-c (FIG. 3), scale them to the appropriate size, and place the scaled decoded video in the appropriate location in the frame memory. In addition, the video synchronization information can be associated with the data stored in the frame memory. After handling the updated LDF, the LDFH can go into an idle stage until the next received indication that an updated LDF is ready and its associated URL.

Figure 5:
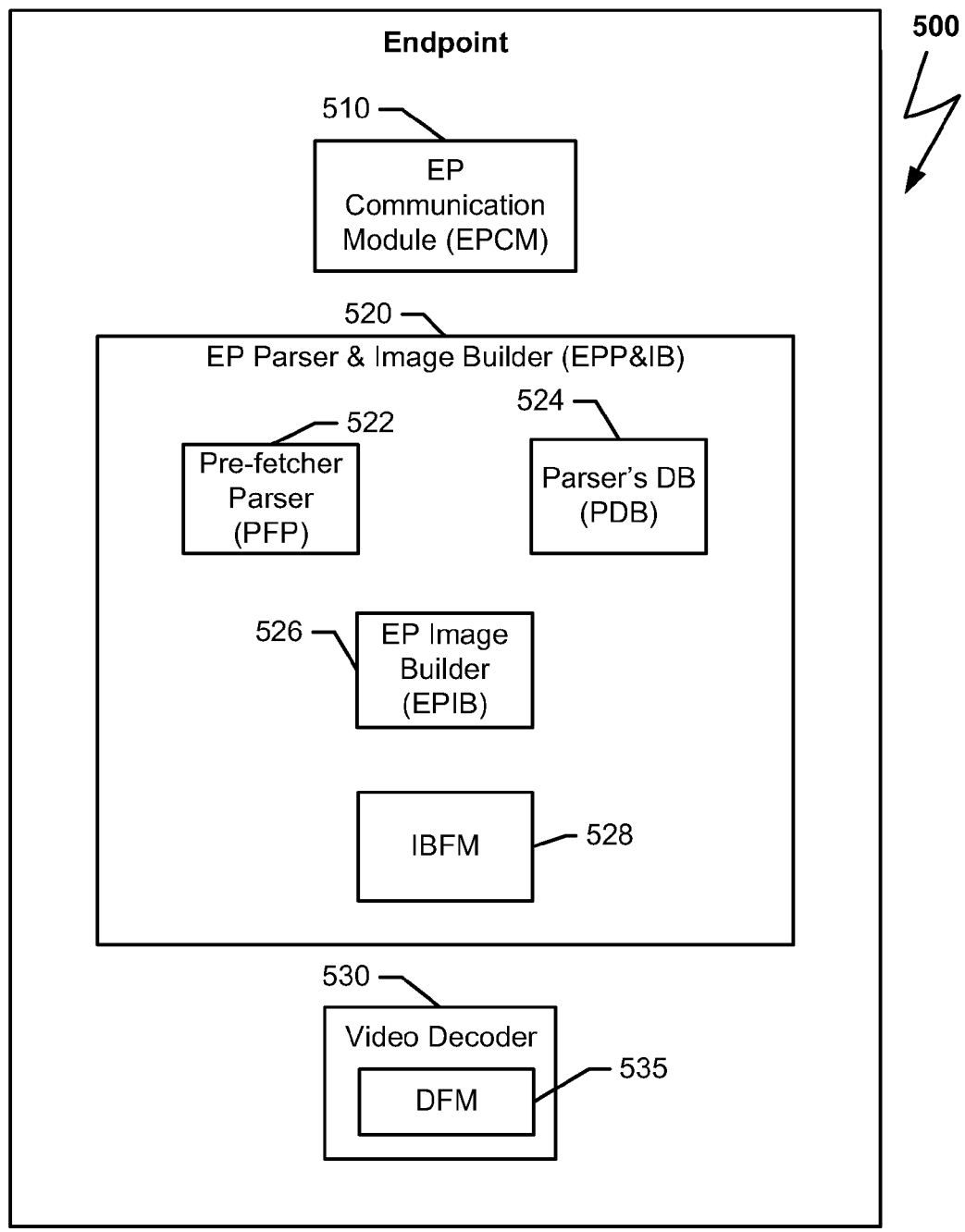
FIG. 5 is a simple block diagram with relevant elements of an exemplary endpoint (EP)

FIG. 5 illustrates a simple block diagram with relevant elements of an endpoint 500 including an endpoint communication module (EPCM) 510, an endpoint description file parser and image builder (EPP&IB) 520, and a video decoder 530 having a decoder frame memory module DFM 535. EPP&IB 520 can include a pre-fetcher parser (PFP) 522, a Parser's database (PDB) 524, an image builder 526, and an image builder frame memory module IBFM 528.

EPCM 510 can perform common tasks of a communication module of an endpoint for handling media communication using a video conferencing communication protocol such as H.323, SIP, H.320, etc. In addition EPCM 510 can be adapted to handle communication with a LDFG as illustrated above (400a FIG. 4a). The communication with the LDFG can be via a packet-based network such as a LAN, Internet, Intranet, etc., or any type of network that is used for digital communication. In one embodiment video synchronization information can be embedded in one or more RTP headers of packets coming from the MCU. The packets can be media packets such as video, audio, and/or control and signaling packets. The EPCM 510 can be adapted to parse the RTP headers and deliver the video synchronization information to the EPP&IB 520 and to video decoder 530.

Video decoder 530 can decode received compressed composite video data composed by the MCU. The decoding can be based on a compression standard used during the video session. Exemplary compression standards include H.263, H.264, etc. The decoded output video data can be stored in decoder frame memory module 535 (DMF). Each address of the frame memory 535 is associated with a pixel or a group of pixels on the screen of the endpoint. Frame memory module 535 can employ two or more frame memories (current output frame memory, next frame memory, in preparation frame memory, etc.). The memories alternately store and output video data of consecutive decoded frames. The decoded data can be written in the next frame memory while EPP&IB 520 reads decoded video data from a current output frame memory 535. Each decoder frame memory 535 can be associated with relevant video synchronization information sent by the MCU in association with the composite video. The association can be done by pointing the relevant one or more decoder frame memories 535 by the video synchronization information.

In an embodiment in which video synchronization information is embedded within the video stream the decoder 530 can be adapted to the video synchronization information. For example, in case of using compression standard H.264, decoder 530 can be adapted to parse one or more Supplementary Enhanced Information (SEI) packets which were added in order to carry video synchronization information between the MCU and the endpoint. The decoded (parsed) video synchronization information can be associated to the appropriate DFM 535 and be used for guiding the EPP&IB 520 to select an appropriate EPLDF that matches the video data received from the decoder frame memory 535.

If H.263 is the compression standard, one or more Picture Supplemental Enhancement Information (PSUPP) fields in the frame header can be modified by an associated encoder in the MCU to carry video synchronization information. The decoder 530 can be adapted to parse the relevant PSUPP fields. The decoded (parsed) video synchronization information can be associated to the appropriate DFM 535 used by EPIB 526 for matching the decoded video with an appropriate EPLDF.

EPP&IB 520 may run a pre-fetcher task in parallel with an image builder task on receiving a link to a new endpoint layout description file (EPLDF). The link can be sent directly from LDFG or via the MCU. The new EPLDF can be fetched from LDFG 360 (FIG. 3) and parsed by PFP 522 using a modified parser engine. The modified parser can perform additional tasks that are relevant to the protocol used to describe the EPLDF. The modified parser can be adapted to fetch objects from their URLs and store them in the PDB 524 without processing the fetched objects. PFP 522 can use a pre-fetched index table wherein each entry in the pre-fetched index table can be associated with layout synchronizing information and can point to a location in PDB 524 where an object from a certain link is stored. Alternatively, a cache can be used instead of PDB 524 and the pre-fetched index table.

During parsing the first layer description file an exemplary PFP 522 may parse the layout synchronization information associated with the EPLDF. The layout synchronization information can be stored in one of the first fields of the received EPLDF. The layout synchronization information can be associated with an entry in the pre-fetched index table. Parsing the EPLDF may continue and a link to a URL of the background slide 210 (FIG. 2) can be found. The background slide can then be fetched from LDF-DB 430 (FIG. 4*a*) based on the URL and can be stored in the PDB 524 and the pre-fetched index table can be updated accordingly. Parsing the first layer description file may continue and a link with a URL of the next layer description file can be accessed.

The next layer description file can be fetched from LDF-DB 430 (FIG. 4*a*). An example second layer description file (the video layer) 120 is illustrated in FIG. 1. This file defines three video rectangles 122*a-c*. While parsing the second layer description file, PFP 522 may access a link to an object that defines the first video rectangle, fetch the object, store it in PDB 524, and write a record in the index table. Such a process may be repeated for each rectangle. Each object can include a software code (JavaScript, for example) and a set of coordinates and size of the rectangle. The code, when is initiated, can be capable of converting the coordinates and the size of the rectangle into memory space in DFM 535, retrieving pixels data from the appropriate addresses in DFM 535, and placing the pixel data in the appropriate addresses of IBFM 528. After parsing and storing the fetched information related to last rectangle 122*c* in PDB 524, a URL to the next layer description file can be accessed.

In other exemplary embodiments, the module that processes the information on the video rectangles and build the video layer may be embedded as part of EPIB 526 and the description file may include a command to initiate the process.

The next layer description file can be fetched from LDF-DB 430 (FIG. 4*a*). An example third layer description 130 is illustrated in FIG. 1. This file defines three border lines 132*a-c*, three text areas 134*a-c*, and two rectangles 136*a* & *b* for displaying data from external sources. During parsing the third layer description file the PFP 522 may access links to accessory elements. Per each link, the relevant object related to an accessory element can be fetched, stored in PDB 524, and the pre-fetched index table updated accordingly.

PFP 522 can access a URL of a web object associated with area 136*a*. Information related to the accessory element can be fetched via EPCM 510 and stored in PDB 524. The pre-fetched index table can be updated accordingly. Depending on its URL, the object can be fetched from LDF-DB 430 (FIG. 4) or from any other web-site corresponding to the URL. The retrieved information can be static data such as a presentation slide, a pdf file, etc. If the information is dynamic information such as news, status of stocks, etc., the retrieved object can include a software code running in a loop for updating the information. After storing the retrieved data related to area 136*b* the layer description file is parsed until the end of LDF indication is reached. The information for building the following video images of the endpoint is thusly fetched and stored in PDB 524. This information can be used by EPIB 526 when the video synchronization information of the next DFM 535 matches a layout synchronization of the stored data PDB 524. Then PFP 522 can go into an idle stage until it receives a link to a newer EPLDF.

EPIB 526 can repetitively build the next output frame. Exemplary EPIB 526 can run in a loop as long as a session is active. Each cycle can be initiated according to the frame rate used by the endpoint. At the beginning of a cycle the Video Synchronization Information of the next DFM 535 can be retrieved and compared to the pre-fetched index table. The pre-fetched index table can be searched for an entry that is associated with layout synchronization information matching the video synchronization information of the DFM 535.

The matched pre-fetched EPLDF can be retrieved from PDB 524 and parsed by EPIB 526 using a modified parser engine. The modified parser engine can perform tasks relevant to the protocol used to describe the EPLDF such as composing the final video image to be displayed to the conferee, including all the accessory elements and the composite video as illustrated by phase 230 (FIG. 2). Furthermore, the modified parser can be modified to retrieve the content of the different links from the PDB 524. An exemplary EPIB 526 can use the pre-fetched index table for retrieving the content of the pre-fetched links.

While parsing the first layer description file EPIB 526 may parse the EPLDF and a link with a URL of the background slide 110 (FIG. 1). The background slide can be retrieved from PDB 524. Retrieving the background slide can be via its URL and the pre-fetched index table. The background slide can be processed according to its file format and converted into pixel data to be stored in the next IBFM 528 according to pixel addresses. Following processing the background slide, the data at IBFM 528 can reflect the image 210 (FIG. 2). Parsing the first layer description file can continue and a link with a URL of the next layer description file can be accessed.

The next layer description file can be retrieved from PDB 524. An example second layer description file 120 is illustrated in FIG. 1. This file defines three video rectangles 122a-c. The EPIB 526 may access a links to objects that define the video rectangles. Each object may include parameters (size and coordinates) as well as software code and be retrieved from the appropriate address in PDB 524. After initiation, the code can convert the coordinates and the size of the rectangle into two sets of addresses. The first set of addresses is the pixel addresses in IBFM 528. The calculation of the pixel addresses in IBFM can be based on the resolution of the display of the endpoint. The second set of addresses can be the pixel address of DFM 535 related to the same areas. The calculation of the pixel addresses in DFM can be based on the resolution of the video image. The software code can be further adapted to retrieve the pixel data from the appropriate addresses in DFM 535, which is associated with the relevant video synchronization information, and store the pixel data in the appropriate addresses of IBFM 528 instead of data previously stored there.

After handling the last pixel of the first video rectangle, the software code can instruct the EPIB 526 to continue parsing the second layer description file and the software code defining the first rectangle can be terminated. Parsing the second layer description file can continue and EPIB 526 can access a link to an object that defines the second video rectangle 122a-c and process it similar to the first video rectangle. After handling the second rectangle EPIB 526 can continue to the third link. After parsing and processing the last rectangle the data at IBFM 528 reflects the image 220 (FIG. 2). Parsing the second layer description file can continue and a link with a URL of the third layer description file can be accessed.

The top layer description file can be fetched from PDB 524. An example third layer description 130 is illustrated in FIG. 1. This file defines three frames 132a-c, three text areas 134a-c, and two rectangles 136a & b for displaying data from external sources. During parsing the third layer description file the EPIB 526 can access links to each accessory element. Per each link the relevant object related to an accessory element is retrieved from PDB 524 and be processed. The retrieved object can include a set of parameters (size, thickness, color, text and coordinates, for example) as well as the software code. The software code can be initiated to create pixel data based on the set of parameters and store the pixel data in the appropriate addresses in IBFM 528. After processing the last pixel of the first border lines 132a the software code can instruct the EPIB 526 to continue parsing the third layer description file and the software code can be terminated. Parsing the third layer description file can continue and EPIB 526 can reach a link to the second border lines 132b and process the link in a similar procedure as the first one. After handling the second border lines 132b EPIB 526 can continue to the third link and so on.

After parsing and processing the last element 134c a link with a URL of a web object associated with area 136a, can be accessed. Based on the URL and the pre-fetched index table the object can be fetched from PDB 524. The object can include software code and data. The software code can place the relevant data in the appropriate location in IBFM 528. If the data includes dynamic information such as news, status of stocks, etc., the software code can run in a loop, keeping the data updated. After storing the information in IBFM 528, the parsing of the third layer description file may continue and the URL of the second web object, i.e., the object associated to area 136b (FIG. 1) can be accessed and processed. Following storing the data related to area 136b (FIG. 1), parsing the layer description file can continue until the end of EPLDF indication is reached. The stored data in IBFM 528 can reflect an image according to phase 230 (FIG. 2) and IBFM 528 is ready to be displayed. EPIB 526 is ready to start processing and building a next IBFM by parsing the same LDF or a new one depending on the video synchronization information of the next DFM 535.

In an alternate embodiment wherein each object has a 'Z' parameter reflecting the level of the object, EPIB 526 can be adapted first to search and handle all the elements that are associated with 'Z'=0 followed by elements that are associated with 'Z'=1, then 'Z'=2, etc. Each object can be fetched based on the appropriate URL and the pre-fetched index table from PDB 524, be processed by EPIB 526, and be placed in the appropriate pixel addresses of IBFM 528. In FIGS. 1 & 2 the background slide 110 has 'Z'=0 and is fetched first placed in IBFM 528 to create phase of 210 FIG. 2. Then the objects with Z=1 are handled (the video rectangle, for example). The data of a later object is written instead of the data of a previous object (a lower 'Z' value), which was written in the same relevant pixel address of the IBFM 528. The video data from the relevant addresses of the relevant DFM 535 are retrieved and placed in IBFM 528 to create the snapshot of 220 FIG. 2. The process can continue until the data in IBFM 528 reflects snapshot 230 (FIG. 2). More information on the operation of endpoint 500 is depicted below in conjunction with FIGS. 8a and 8b.

Figure 6:
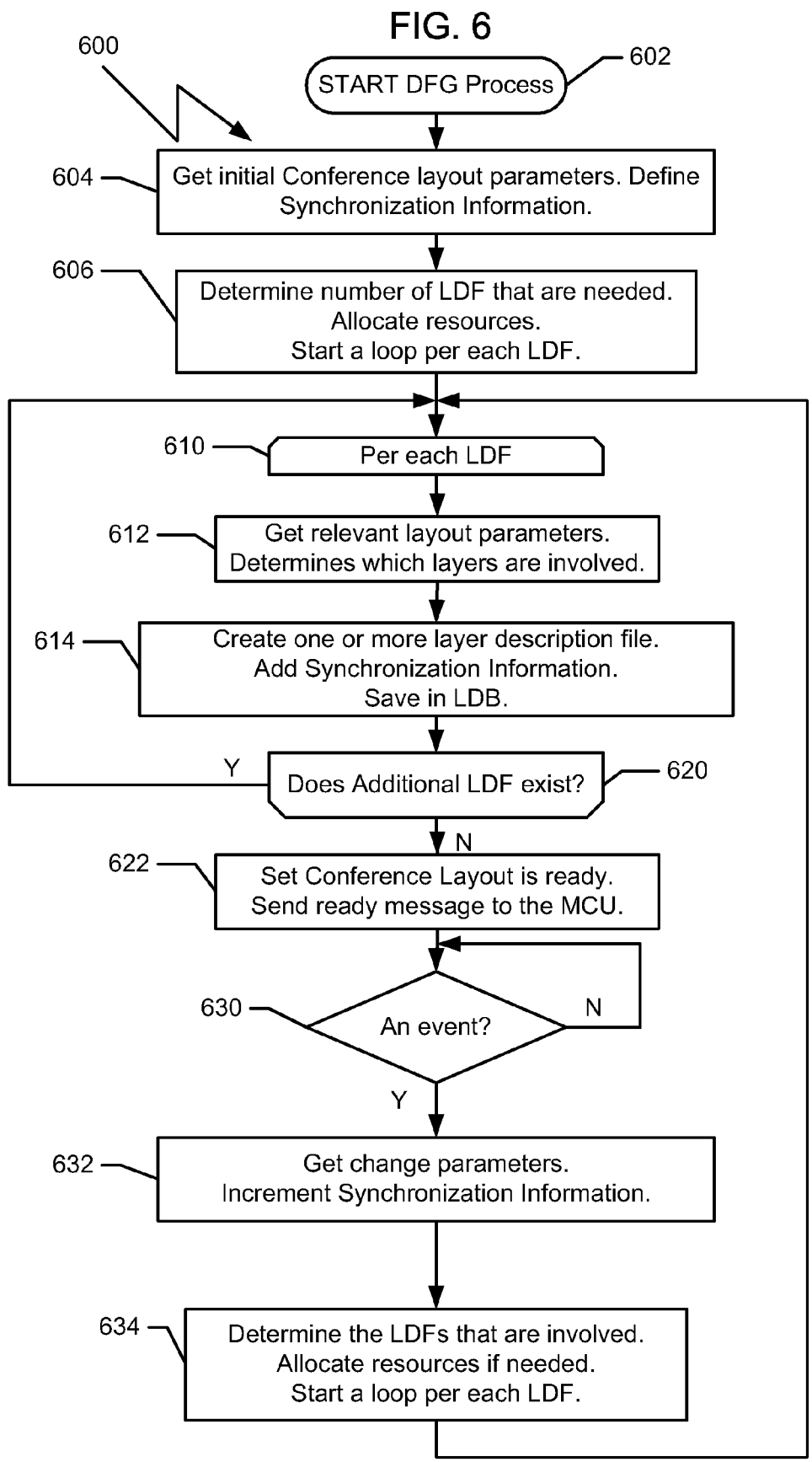
FIG. 6 illustrates a flowchart showing relevant steps of an exemplary process of an exemplary Layout Description File Generator.

FIG. 6 illustrates a process 600 executed by Layout Description File Generator. Method 600 can be implemented by an LDFG using a loop for creating a plurality of LDFs. Process 600 can be initiated 602 by the CMM 410 (FIG. 4a) on receiving a request to start a new video session and will run as long as the associated new session is active. Each video session can be managed by a similar process conducted by an LDFG.

Depending on the configuration and architecture of the conferencing system the request for a new session or a change in a session can be received from an MCU or a management server. Upon its initiation, conference layout information such as conference profile, names of current conferees and their ID numbers used during the session, endpoints addresses, etc., is gathered 604. This information is explained above.

After collecting the relevant conference layout information, synchronization information for the session can be defined 604. The synchronization information is used in order to synchronize the media (audio and video) with the layout at each endpoint.

Based on the information collected, the number of LDFs needed for the session is calculated 606. A session may require multiple LDFs: an MCULDF for each composite video to be built and delivered to each endpoint and an EPLDF for each endpoint that is currently involved in the session. Storage resources are allocated 606 to each LDF at LDF-DB 430 (FIG. 4*a*). After finishing the preparation for creating the LDFs, a loop can be started at step 610 and run per each one of the required LDFs.

At step 612 information related to the currently handled LDF is sorted from the information gathered during process 604. Relevant information can includes the appropriate template LDF; background slide; graphical information; icons; etc. that are used by a targeted endpoint of the current handled EPLDF; content that can be used; names of conferees that will presented on the screen of this endpoint; URLs associated to the current handled LDF, etc. Based on the information relevant to the current handled EPLDF the amount of layers description files embedded within this LDF are defined. Storage resources can be allocated to each one of the layer description files.

After collecting the information relevant to the current handled LDF, the collected information and the synchronization information is transferred to a ML engine that is part of the LDFG. The ML engine processes the collected information and the synchronization information. At the end of process 614 the ML engine delivers one or more layer description files that compose the current handled LDF. The layer description files are stored in the LDF-DB 430 in the appropriate URLs. An exemplary ML engine can be a modified ML file generator such as an HTML engine, XML engine, etc. The ML engine can be modified to create a ML file according to the protocol used as described herein. This protocol defines information and processes that are needed for implementing a LDF. For example, it can define fields that are allocated to the synchronization information, the chained number of layer description files that compose the LDF, etc.

After storing the LDF in the appropriate URL, a decision is made 620 whether additional LDF has to be handled. If yes, method 600 returns to step 610 and runs the loop for the next LDF. If there are no additional LDF, then a flag indicating that the session layout is ready to be delivered/requested, is set 622. A ready message can be sent to the MCU. The ready message can indicate that a ready to use set of LDFs of a session is ready and can be retrieved by the MCU and/or the endpoints. An exemplary ready message can include information on the relevant ready-to-use LDFs. It can be a list of ID numbers of endpoints and the URL from where their associated LDFs can be retrieved; an ID number of output modules 156*a-c* (FIG. 1) and the URLs from where their associated LDF can be retrieved. After sending the message, method 600 may wait 630 for an event to occur, such as for a new speaker to be selected, an additional conferee to join the session, a conferee to leave the session, etc.

If 630 an indication of an event is received, then information related to the change is gathered 632 such names of new conferees and their ID number for the session, the name of a new speaker, addresses of new endpoints, etc. After collecting the relevant information, the synchronization information can be incremented by one.

Based on the information collected, the number of LDFs affected by the changed is identified 634. An existing LDF that may require a modification. The modification can be minor such as changing the speaker or can require replacing the template LDF when additional conferees join the session and the number of presented conferees can be increased from 2×2 to 3×3, for example. LDFs can be required for a new conferee or a conferee leaves the session and his associated LDF can be released, etc. Resources can be allocated or released according to the changes and method 600 returns to step 610 and the loop 610 to 620 can be executed per each one of the effected LDFs.

Figure 7:
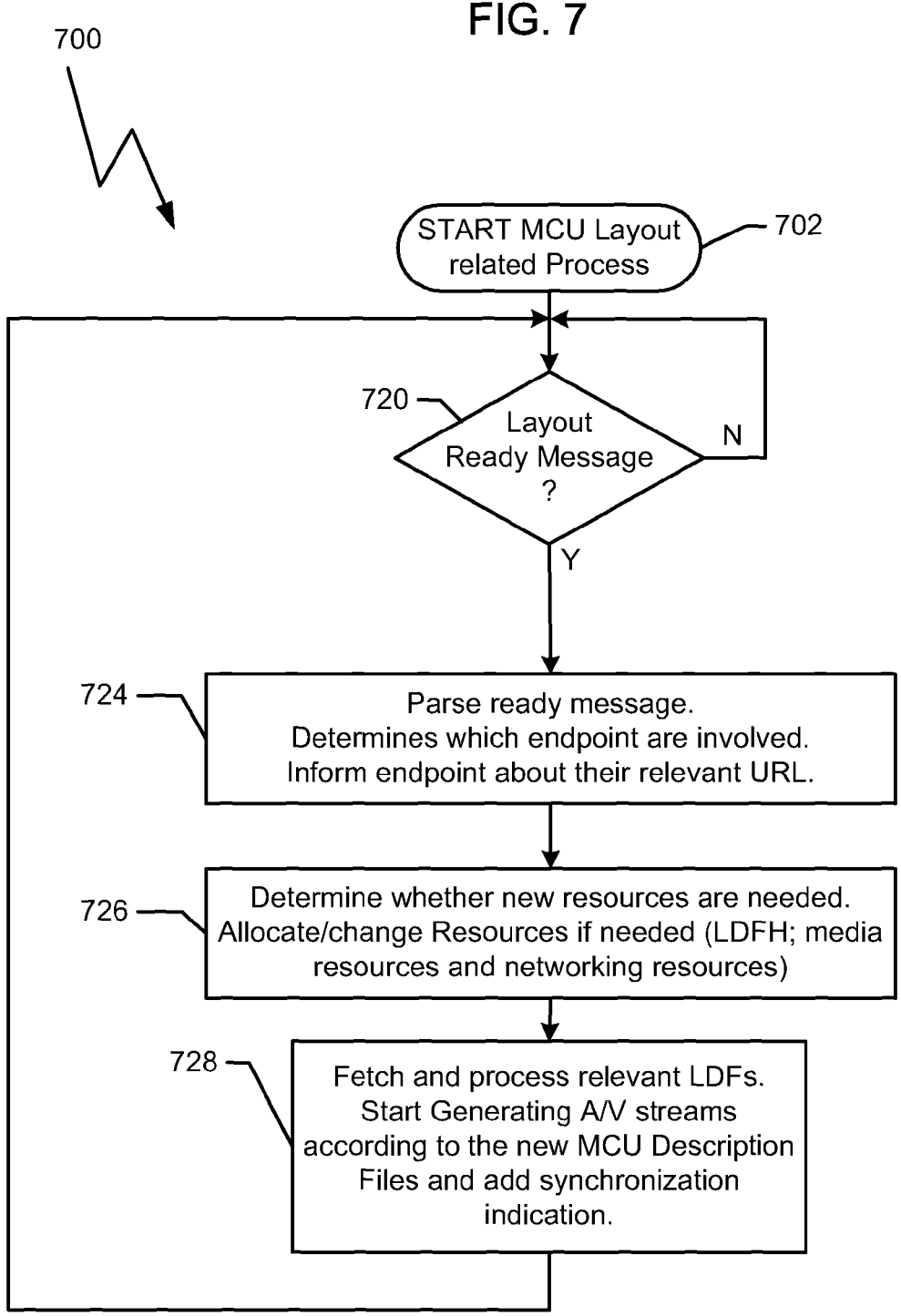
FIG. 7 illustrates a flowchart showing relevant steps of an exemplary layout related process of an MCU.

FIG. 7 illustrates a layout related process 700 of an MCU. Process 700 can be executed by an LDFP 400*b* (FIG. 4). The process can be initiated on power up and can run as long as the MCU is active. Following initiation, method 700 can wait 720 for a LDF ready message.

On receiving 720 the LDF ready message, the message is parsed 724. The message can be sent when a new set or a modified set of LDFs is ready to be used and can be fetched. The message can include a list of LDFs that are related to the same session. Each entry in the list can include an ID number of an endpoint or an output module 156*a-c* (FIG. 1) and a URL from where the relevant LDF can be fetched. The ready message can be parsed 724 and a message from the MCU can be sent to each listed endpoint. The message to the endpoint can be sent over a signaling and control connection between the MCU and the endpoint. The signaling and control connection can be based on H.323 or SIP protocols, for example. The message to the endpoint can include a URL from where a relevant updated LDF can be fetched from the LDF-DB 430 (FIG. 4*a*). Upon receiving the message, the endpoint can send a request to fetch the LDF.

Parsing the ready message can continue 728 and a decision made whether a change in the current resources of the MCU is needed. Changing resources can include adding media resources for handling the audio and/or video data of a new conferee, releasing media resources of a conferee that left the session, adding/releasing networking resources for interfacing a new/abandoned conferee, modifying management resources such as LDFH 470*a-c* to handle LDF activity related to a new output module associated with a new conferee, etc. The resources can be allocated accordingly. Each of the new LDFHs 470*a-c* can receive its associated URL according to the list written in the ready message.

After setting the resources of the MCU for handling the new situation, each LDFH 470*a-c* (FIG. 4*b*) involved in the change can fetch 728 and process its associated LDFs using its associate URL; instruct its associated output module 156*a-c* (FIG. 1) how to build the composite layout; deliver the synchronization information to the video encoder and/or to the network interface to be sent with the media to the endpoint. At this point method 700 can return to step 720 and wait for the next layout related interrupt.

Figure 8A:
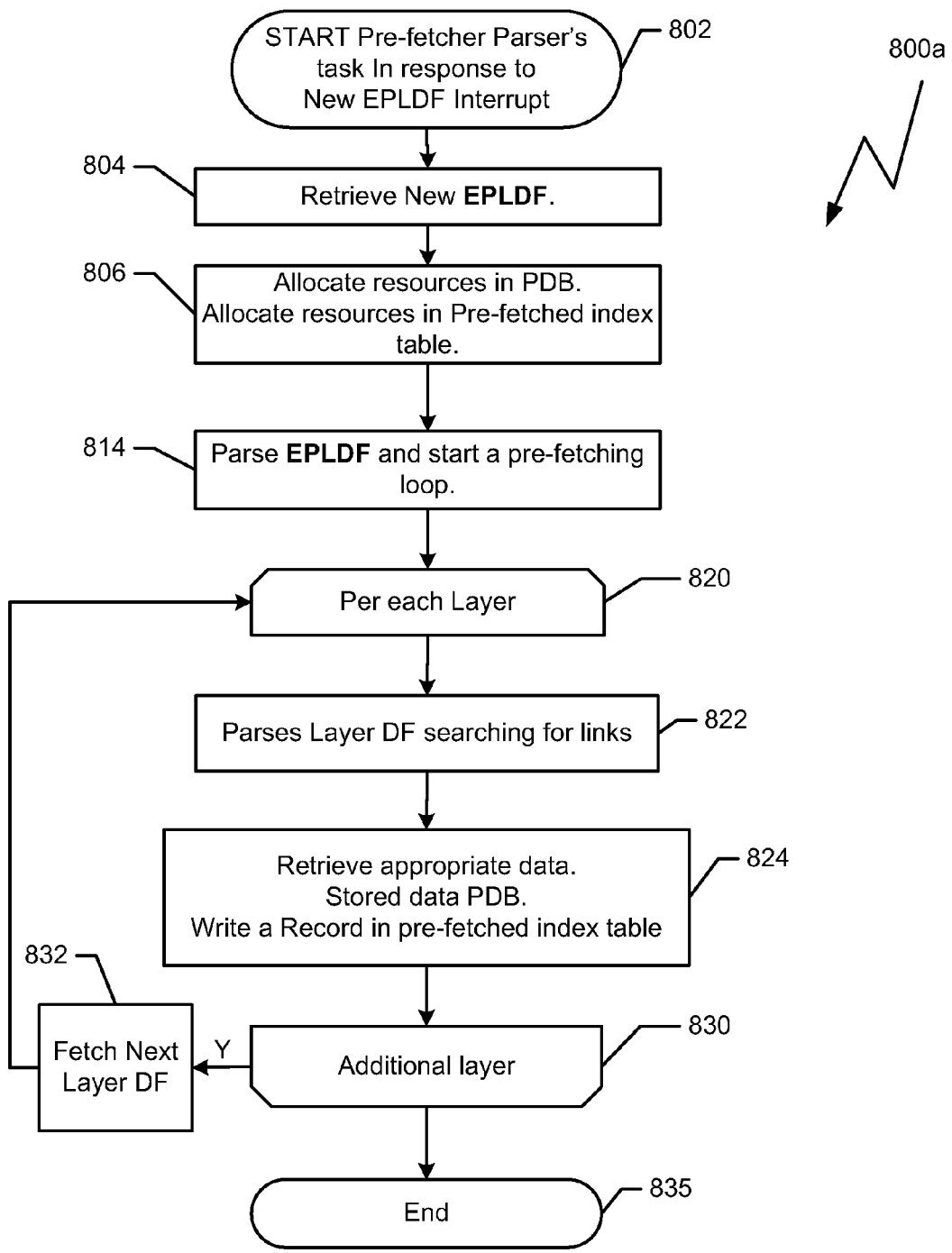
FIG. 8a illustrates a flowchart showing relevant steps of an exemplary pre-fetching process of an EPLDF.

FIG. 8*a* illustrates a process 800*a* for pre-fetching a new EPLDF with its accessory elements from LDF-DB 430 (FIG. 4*a*). Process 800*a* can be implemented by endpoint 500 using PFP 522 (FIG. 5). Process 800*a* can be initiated 802 on receiving an indication that a new EPLDF is ready. The new process can run in the background and pre-fetch all the objects required for constructing the image to be displayed according to the new layout. The pre-fetched EPLDF and its associated objects can be stored in PDB 524 (FIG. 5).

Upon receiving an indication that a new EPLDF related to EP 500 (FIG. 5) is ready, the endpoint can allocated 802 computing and storage resources for handling the new process 800. After allocating the resources, process 800 can be initiated for pre-fetching the objects required for preparing the next displayed layout on the screen of the endpoint. The indication that new EPLDF is ready and its associated URL can be received directly from LDFG 400*a* via an IP network, for example. Alternatively, the indication can be sent from the LDFG 400*a* to the MCU. The MCU can deliver the indication with its URL to the endpoint via a control and signaling connection, for example or according to any other exemplary methods as described above. After initiation 802 the relevant EPLDF can be fetched 804 based on its URL from the LDF-DB 430 (FIG. 4*a*).

At step 806 a storage resources in PDB 524 (FIG. 5) and an entry in the pre-fetched index table can be allocated to be used for storing the pre-fetched EPLDF and its associated accessory elements. Method 800*a* can start parsing 814 the fetched new EPLDF. Parsing the LDF and pre-fetching the accessory elements can be in a loop 820 to 830, once per each layer description file. For the example of FIGS. 1 and 2, the loop can have three cycles. The first layer description file is parsed 822. Each link, at its turn, is pre-fetched and stored in PDB 524 (FIG. 5). During parsing the first layer description file, an exemplary PFP 522 may parse the layout synchronization information that is associated with the EPLDF. The layout synchronization information can be stored in one of the first fields of the received EPLDF. The layout synchronization information can be associated to the entry in the index table and/or the storage area in PDB 524 allocated in step 806. Parsing the LDF can continue and a link with a URL of the background slide 210 (FIG. 2) can be accessed. The background slide can be pre-fetched 824 based on the URL, from LDF-DB 430 (FIG. 4*a*); stored in the PDB 524 in the appropriate location; and the index table can be updated. Parsing the first layer description file can continue and a link with a URL of the next layer description file can be found 830.

The next layer description file can be fetched from LDF-DB 430 (FIG. 4*a*) and method 800 can return to step 820 and start the next cycle in the loop. In this cycle the second layer (i.e., 120 in FIG. 1) can be parsed 822. The PFP 522 can access links to each object. Each object can be pre-fetched 824, based on the URL, from LDF-DB 430 (FIG. 4*a*) and stored in the PDB 524 in the appropriate location. The pre-fetched index table can be updated accordingly. Parsing the second layer description file can continue and a link with a URL of the next layer description file can be found 830.

The next (i.e., 130 in FIG. 1) layer description file can be fetched 832 from LDF-DB 430 (FIG. 4*a*). After fetching the third layer description file, the next loop can be started 820. During parsing 822 the third layer description file the PFP 522 (FIG. 5) may access links to the accessory elements. Each object (accessory element) can be pre-fetched 824, based on its URL, from LDF-DB 430 (FIG. 4*a*) and be stored in the PDB 524 in the appropriate location and the pre-fetched index table updated accordingly. Parsing the third layer description file can continue and the end of LDF indication can be reached indicating that there are no additional layers 830 (in this example). At this point, the stored data in PDB 524 includes all the information required to build a displayed video image according to the new EPLDF and method 800*a* can be terminated 835 or go into an idle stage waiting for a newer EPLDF.

FIG. 8*b* illustrates a process 800*b* for composing (building) a new video frame to be displayed by an endpoint. The video frame is composed from a plurality of accessory elements embedded within an EPLDF and a composite video frame received from an MCU. Process 800*b* can be implemented by endpoint 500 (FIG. 5) and/or executed by EPIB 526 (FIG. 5). The process can be initiated 842 by PFP 522 (FIG. 5) on terminating the pre-fetch process 800*a* (FIG. 8) of the first EPLDF with its accessory elements. The building process can run in a loop as long as the video session is active. Each cycle of the loop can be initiated by a timer according to the frame rate of the endpoint. Alternatively, each loop can be initiated by an interrupt indicating that a new DFM 535 (FIG. 5) is ready.

After its initiation 842 process 800*b* can set 844 a Layout Synchronization Information Register (LSIR) with the value of the layout synchronization information associated with the first received EPLDF of the session. After setting the LSIR, a frame loop can be initiated. Each frame cycle can be associated with a ready-to-use next DFM 535 (FIG. 5). Alternatively, a loop can be initiated by a timer according to the fame rate of the endpoint. At step 546 the video synchronization information associated with the ready-to-use next DFM 535 (FIG. 5) can be retrieved and compared 850 to the value stored in the LSIR.

If 850 the video synchronization of the next ready-to-use DFM 535 matches the value of LSIR, then the associated pre-fetched EPLDF can retrieved 854 from the PDB 524. Retrieving the EPLDF can be based on information written in the pre-fetched index table in the entry associated with the layout synchronization value. Parsing of the retrieved pre-fetched EPLDF can be initiated 856 and executed in a loop 860 to 870, once per each layer description file. For the example of FIGS. 1 and 2, the loop can have three cycles. The first layer description file is parsed 862. Each link, at its turn, is retrieved from PDB 524 (FIG. 5) according to its URL and the index table. During parsing the first layer description file of the EPLDF a link with a URL of the background slide 210 (FIG. 2) can be accessed. Then the background slide can be retrieved 864 based on the URL and the index table from PDB 524 (FIG. 5). The background slide can be processed according to the file format of the background slide and stored in IBFM 528 in the appropriate pixel addresses. Parsing the first layer description file may continue and a link with a URL of the next layer description file can be accessed 870.

At step 872, the next layer description file can be fetched from PDB 524 (FIG. 5) according to its URL and the index table and method 800b can return to step 860 and start the next cycle in the loop. In this cycle the second layer can be parsed 862 as described above and then a link with a URL of the next layer description file can be accessed 870. The third layer is parsed as described above until an end of EPLDF indication is reached 870. At this point, the stored data in IBFM 528 (FIG. 5) can reflect an image that looks like snapshot 230 (FIG.2) and IBFM 528 is ready to be displayed. EPIB 526 can start the next frame cycle build a next IBFM by parsing the same EPLDF or a newer one. Method 800*b* can return to step 846 and can start the next frame loop. Alternatively, method 800*b* may wait for an interrupt indicating that a next DFM 535 (FIG. 5) is ready or can start the next frame loop depending on a timer that was set according to the endpoint frame rate.

Returning to step 850, if the video synchronization information of the ready next DFM 535 (FIG. 5) does not match the value of LSIR, then the pre-fetched index table is searched 852 for an entry that is associated with a layout synchronization information that matches the video synchronization of the ready to use next DFM. If 880 such an entry is not found, then the current used IBFM 528 (FIG. 5) is frozen 886 and can be displayed again during the next endpoint frame period. Then method 800*b* is ready to start the next frame cycle.

If 880 an entry in the pre-fetched index table associated with the matched layout synchronization information is found, then resources associated with the previous layout synchronization information can be released. The resources can include storage volume in PDB 524 (FIG. 5) and in the pre-fetched index table, for example. The matched layout synchronization information is stored in the LSIR and method 800*b* can continue from step 854 and processing the new EPLDF.

In the present disclosure, the words "unit," "element," "module" and "logical module" can be used interchangeably.

Anything designated as a unit or module can be a stand-alone unit or a specialized or integrated module. A unit or a module can be modular or have modular aspects allowing it to be easily removed and replaced with another similar unit or module. Each unit or module may be any one of, or any combination of, software, hardware, and/or firmware.

In the description and claims of the present disclosure, "comprise," "include," "have," and conjugates thereof are used to indicate that the object or objects of the verb are not necessarily a complete listing of members, components, elements, or parts of the subject or subjects of the verb.

It will be appreciated that the above described apparatus, systems and methods can be varied in many ways, including, changing the order of steps, and the exact implementation used. The described embodiments include different features, not all of which are required in all embodiments of the present disclosure. Moreover, some embodiments of the present disclosure use only some of the features or possible combinations of the features. Different combinations of features noted in the described embodiments will occur to a person skilled in the art. Furthermore, some embodiments of the present disclosure can be implemented by combination of features and elements that have been described in association to different exemplary embodiments along the discloser. The scope of the invention is limited only by the following claims.

What is claimed is:

1. A method for composing a videoconferencing displayed image, comprising:
    creating a description of a videoconferencing displayed image;
    providing the description to an endpoint;
    providing one or more video streams from a multipoint control unit to the endpoint; and
    composing at the endpoint based on the description a videoconferencing displayed image from the one or more video streams,
    wherein the description comprises location and size information corresponding to each of the one or more video streams.

2. The method of claim 1, wherein the description comprises at least one file that can be processed by the endpoint.

3. The method of claim 2, wherein the file is a mark-up language file.

4. The method of claim 1, wherein the description defines one or more accessory elements to be displayed with the the videoconferencing displayed image on a screen of the endpoint.

5. The method of claim 4, wherein at least one of the accessory elements is selected from a group consisting of text related to an image in the videoconferencing displayed image, icons, border lines, presentations, and web-pages.

6. The method of claim 1 wherein the description defines 'Z' values for objects within the videoconferencing displayed image wherein the 'Z' values define levels in which the objects are to be displayed in the videoconferencing displayed image.

7. The method of claim 1, wherein the description comprises two or more files, each file corresponding to a layer in the videoconferencing displayed image.

8. The method of claim 1, wherein the one or more of the video streams and the description are associated by synchronization information.

9. A method of multipoint videoconferencing, comprising:
    providing an MCU with MCU layout description files corresponding to events in the videoconference, the MCU layout description files configuring the MCU to compose conference composite video images and send the conference composite video images to an endpoint; and
    providing the endpoint with endpoint layout description files corresponding to the events in the videoconference, the endpoint layout description files instructing the endpoint to compose a videoconferencing displayed image including the conference composite video images.

10. The method of claim 9, wherein the conference composite video images comprise video images from two or more endpoints and wherein the MCU layout description file defines the size of the endpoint video images and their location in the conference composite video images.

11. The method of claim 9, wherein the endpoint layout description files define one or more accessory elements selected from a group consisting of text related to an image in the videoconferencing displayed image, icons, border lines, presentations, and web-pages.

12. The method of claim 9, further comprising providing the endpoint and the MCU with synchronization information to synchronize processing conference composite video images with processing the endpoint layout description files.

13. The method of claim 12, wherein the video synchronization information is provided to the endpoint from the MCU along with the conference composite video images.

14. The method of claim 9, further comprising updating the MCU layout description files and endpoint layout description files responsive to a change in the videoconference.

15. The method of claim 12, further comprising:
    receiving an indication of a change in the videoconference;
    creating an updated endpoint layout description file reflecting the change;
    creating an updated MCU layout description file reflecting the change;
    updating synchronization information; and
    sending the updated endpoint layout description file and the updated synchronization information toward the endpoint and the MCU.

16. A videoconferencing apparatus, comprising:
    a logical module capable of creating endpoint layout description files corresponding to events in a videoconference, wherein the endpoint layout description files, when processed at an endpoint, create with received composite video images a videoconferencing displayed image to be presented at the endpoint; and
    a network interface adapted to send the endpoint layout description file to the endpoint.

17. The apparatus of claim 16, further adapted to create an MCU layout description file corresponding to events in the videoconference, the MCU layout description files configuring the MCU to compose conference composite video images from video received from one or more endpoints.

18. The apparatus of claim 17, further adapted to provide synchronization information for synchronizing processing of the endpoint layout description files with the processing of the received composite video images from the MCU.

19. An MCU, comprising:
    a parser capable of processing a MCU layout description file to generate instructions for composing conference composite video images;
    a video module for composing the conference composite video images according to the instructions;
    a logical module for associating synchronization information with the conference composite video images; and a network interface module for sending the conference composite video images and the synchronization information to an endpoint.

20. The MCU of claim 19, wherein the conference composite video images comprise endpoint video received from one or more endpoints.

21. The MCU of claim 20, wherein the instructions comprise the size and location of the endpoint video within the conference composite video images.

* * * * *